United States Patent
Romig (10) Patent No.: US 6,424,111 B1
(45) Date of Patent: Jul. 23, 2002

(54) ROBOTIC LIBRARY DESIGN FOR A STORAGE CARTRIDGE PICK AND PLACE MECHANISM

(75) Inventor: Alan D. Romig, Broomfield, CO (US)

(73) Assignee: Breece Hill Technologies, Inc., Boulder, CO (US)

(*) Notice: Subject to any disclaimer, the term of this patent is extended or adjusted under 35 U.S.C. 154(b) by 0 days.

(21) Appl. No.: 09/709,100

(22) Filed: Nov. 10, 2000

(51) Int. Cl.[7] .............................................. G05B 19/04
(52) U.S. Cl. .............. 318/568.21; 318/567; 318/568.11
(58) Field of Search ............................ 318/567, 568.1, 318/568.11, 568.21

(56) References Cited

U.S. PATENT DOCUMENTS

| | | | |
|---|---|---|---|
| 3,317,212 A | 5/1967 | Tatter et al. ................ 274/11 |
| 3,431,367 A | 3/1969 | Nickl ...................... 179/100.2 |
| 4,005,782 A | 2/1977 | Crockett ................. 214/1 BB |
| 4,438,468 A | 3/1984 | Kamei et al. ................ 360/92 |
| 4,802,035 A | 1/1989 | Ohtsuka ...................... 360/92 |
| 4,844,679 A | 7/1989 | Teranishi .................... 414/331 |
| 4,846,619 A | 7/1989 | Grabtree et al. ............ 414/273 |
| 4,864,511 A | 9/1989 | Moy et al. .................. 364/478 |
| 4,907,889 A | 3/1990 | Simone ....................... 360/92 |
| 4,981,409 A | 1/1991 | Hirose et al. ............... 414/225 |
| 4,984,106 A | 1/1991 | Herger et al. ................ 360/92 |
| 5,010,536 A | 4/1991 | Wanger et al. ............... 369/36 |
| 5,143,193 A | 9/1992 | Geraci ....................... 194/212 |
| 5,206,814 A | 4/1993 | Cablander et al. .......... 364/479 |
| 5,231,552 A | 7/1993 | Schneider et al. ............ 360/92 |
| 5,235,474 A | 8/1993 | Searle ........................ 360/71 |
| 5,274,516 A | 12/1993 | Kakuta et al. ................ 360/92 |
| 5,353,179 A | 10/1994 | Elliott et al. .................. 360/92 |
| 5,371,640 A | 12/1994 | Kvifte et al. .................. 360/92 |
| 5,392,266 A | 2/1995 | Kobayashi et al. ........... 269/36 |
| 5,429,470 A | 7/1995 | Nicol et al. ................. 414/331 |
| 5,450,391 A | 9/1995 | Pollard ...................... 369/191 |
| 5,460,476 A | 10/1995 | Gazza ........................ 414/786 |
| 5,471,561 A | 11/1995 | Cowgill et al. ................ 395/82 |
| 5,502,697 A | 3/1996 | Taki ............................ 369/34 |
| 5,532,931 A | 7/1996 | Erickson, Jr. et al. .. 364/478.06 |
| 5,537,268 A | 7/1996 | Felde et al. ................... 360/92 |
| 5,601,391 A * | 2/1997 | Gazza ........................ 414/280 |
| 5,610,882 A | 3/1997 | Dang ......................... 369/36 |
| 5,622,470 A | 4/1997 | Schaefer et al. ............ 414/786 |
| 5,631,785 A | 5/1997 | Dang et al. ................... 360/92 |
| 5,659,444 A | 8/1997 | Dang et al. .............. 360/98.04 |
| 5,663,938 A | 9/1997 | Dang et al. ................... 369/36 |
| 5,666,337 A | 9/1997 | Dang et al. ................... 369/36 |
| 5,673,155 A | 9/1997 | Motoyama et al. ........... 360/92 |
| 5,684,654 A | 11/1997 | Searle et al. .................. 360/92 |
| 5,691,859 A | 11/1997 | Ulrich et al. ................. 360/92 |
| 5,746,464 A * | 5/1998 | Paul .......................... 294/116 |
| 5,781,367 A * | 7/1998 | Searle et al. .................. 360/92 |
| 5,815,340 A | 9/1998 | Barkley et al. ............... 360/92 |
| 5,892,750 A | 4/1999 | Barkley et al. ............. 369/178 |
| 5,894,941 A * | 4/1999 | Woodruff ................. 211/41.12 |
| 5,956,301 A | 9/1999 | Dimitri et al. ................ 369/34 |
| 6,085,123 A * | 7/2000 | Baca et al. .................. 700/214 |

* cited by examiner

Primary Examiner—Robert E. Nappi
Assistant Examiner—Rina I. Duda
(74) Attorney, Agent, or Firm—Lathrop & Gage L.C.; Daniel N. Fishman, Esq.

(57) ABSTRACT

A robotic library design for a mechanism that picks and places storage cartridges having a robotic shuttle assembly that moves parallel to the storage cartridges, a moveable stage that moves perpendicular to the storage cartridges, and a pair of gripping finger to retain, extract, and deposit the storage cartridges within the library subsystem. The pair of gripping fingers, initially biased in a closed position, are cammed open by the edges of the storage cartridge upon the moveable stage's approach and close upon engagement with the storage cartridge's notched recesses. The storage cartridge is moved within the library subsystem and is delivered to its destination when a solenoid activates a mechanical trigger that releases the pair of gripping fingers. The moveable stage completes the storage cartridge's delivery and resets for its next instruction.

45 Claims, 9 Drawing Sheets

ROBOTIC LIBRARY DESIGN FOR A STORAGE CARTRIDGE PICK AND PLACE MECHANISM

FIELD OF THE INVENTION

The present invention relates to storage library subsystems as commonly used in the computer data storage arts. Specifically, the present invention relates to the management of storage cartridges by the robotic retrieval and delivery of the cartridges from one location to another within a storage library subsystem. More specifically, the present invention relates to a robotic shuttle's gripping fingers and the associated method by which those fingers grip and release storage cartridges within a storage library subsystem.

PROBLEM

Storage library subsystems provide large capacity secondary storage to modem computing environments. Such storage library subsystems typically employ robotic control mechanisms to physically manage storage cartridges used by host computer's system.

A plurality of storage cartridges are stored within the storage library subsystem either in a linear, a rectangular or a cylindrical array. Each storage cartridge is in a particular slot in the library subsystem. Each slot is identifiable by its physical position within the library subsystem.

The subsystem maintains inventory information to associate a particular cartridge with a particular slot in the subsystem.

Responsive to a host computer system request, an appropriate storage cartridge is physically retrieved from its associated slot in the library, moved to an appropriate read/write device for processing, and inserted into that device. Conversely, when the use of the storage cartridge is complete, the cartridge is retrieved by the robotic mechanism from the read/write device, moved adjacent its associated slot according to the inventory maintained by the subsystem, and inserted into the storage slot of the library ready for future use in response to another host computer system request.

Over time, computing environments have tended to become smaller and less centralized. Prior storage library subsystems were often costly, complex and bulky. While arguably appropriate for centralized large data processing environments, prior storage library subsystems were inappropriate in the more modem decentralized workgroup environments. In these environments, reduced costs, complexity and size of storage library subsystems are essential features.

Related art discloses several data storage options with associated pick and place mechanisms that offer cost, complexity and size reductions. These pick and place mechanisms are notable for their design of a gripping means that is convertible between a retrieval mode, in which the gripping means is capable of engaging and carrying a storage cartridge, and a return mode, in which the gripping means releases the storage cartridge so that the cartridge may be returned to a drive or its storage position.

One presently available cartridge retrieval mechanism, described in U.S. Pat. No. 5,450,391, utilizes a carriage that is slidable along a longitudinal base with attached gripping arms that are pivotally mounted on the carriage. These gripping arms are configured such that when they are advanced against a storage cartridge, they will deflect laterally around the corners of the cartridge until they engage the recessed notches of the cartridge. The '391 patent teaches that two setting components control whether the gripping arms are in the engaged position or the relaxed position. These setting controls are likewise controlled by camming members that exist along the extension and retraction path of the slidable carriage and that trigger the setting components by their physical interaction with the carriage.

Similarly, U.S. Pat. No. 5,691,859 also utilizes a slidable carriage with pivotally mounted gripper arms useful for picking and placing storage cartridges within a library subsystem. The '859 patent is similar in that two camming members and a gripper-tripping projection located on the magnetic drive's bezel independent of the slidable carriage dictate the positioning of the gripper arms. Unlike the '391 patent, the '859 patent teaches a method of cartridge picking that allows the arms to avoid contact with the storage cartridge until the moment of actual engagement in which the gripper arms lock into the recessed notches of the cartridge.

In both patents, and in other related art disclosures, the gripper arms are naturally biased in an open position. Setting the gripper arms for both the retrieval and the return modes is accomplished by mechanical actuators that exist independent of the slidable stage/gripper arm assembly. What is needed is an inexpensive, simplified, and integrated gripper arm/transport assembly that does not require an independent triggering mechanism to set the gripper arms into position for either cartridge extraction or placement. Especially desirable would be an integrated gripper actuator mechanism that improves upon the related art in picking and placing storage cartridges from a multi-position storage magazine to a tape drive with minimal maintenance and with minimal operator interaction.

SOLUTION

The present invention solves the above problems and thereby advances the art by providing a simpler apparatus and corresponding method to retrieve and deliver storage cartridges within a storage library subsystem. Although a tape storage cartridge system is detailed below as the preferred embodiment of the invention, one skilled in the art would recognize that this invention is useful in other storage cartridge systems. The present invention discloses a new robotic shuttle that will pick a tape storage cartridge from a multiple-position storage magazine and place it in a tape drive. In an exemplary embodiment of the present invention, the means to activate and de-activate the gripper arms assembly are located entirely within the motorized stage. The gripper arms are geometrically cammed open by the storage cartridge and fall into the storage cartridge's notched recesses in combination with the gripper arms' bias springs. The gripper arms are forced open in the cartridge placement phase when an integrated solenoid is activated, forcing a mechanical trigger to trip the lower gripper finger in a camming motion that releases the cartridge. The gripper arms' engaging position is reset when the solenoid deactivates upon the withdrawal of the motorized stage from the placement phase. The simplicity of the library system and the linear drive train upon which the motorized stage travels ensures low initial cost, and ease of maintenance and of use, which addresses the needs of the end user. Previous related art feature more complex apparatus and therefore decrease overall reliability through downtime for repair or adjustment that is too costly to justify.

The tape storage cartridge picking and placing apparatus and its associated method are the essential inventions. The robotic shuttle incorporates upper and lower spring-loaded, gripping fingers that are inter-connected by way of a pivot link, attached to the lower gripping finger, and a connecting link, attached to the upper gripping finger, that are themselves inter-connected by a pin. The gripping fingers are mounted to a motorized stage (the Z-stage) that extends from and retracts into the housing of the robotic shuttle (the X-plate) along the Z-axis. The Z-stage is affixed to the X-plate which, in turn, employs a mounted threaded nut to its top panel, that is bi-directionally driven on a worm screw along the X-axis by a motor enabling the robotic shuttle to move cartridges from storage locations to the tape drive and back.

In order to pick a tape storage cartridge, the Z-stage extends distally along the positive Z-axis from the X-plate toward the cartridge magazine. As the spring-loaded, gripping fingers contact the stored cartridge, the cartridge's corners deflect the gripping fingers around the outside of the cartridge in a camming motion against the bias of the springs. The gripping fingers travel around the cartridge's corners and over the cartridge's edges until they reach the standard recessed notches on the top and bottom of the cartridge. Due to the complimentary geometry of both the recessed notches and the spring-loaded, gripping fingers, the gripping fingers snap into the cartridge's recessed notches and securely grasp the cartridge for movement in the opposite direction along the negative Z-axis. When the cartridge is fully extracted from the multipleposition storage magazine and the Z-stage fully retracted into the X-plate, the picked cartridge is ready for a longitudinal move along the X-axis toward the tape drive.

To place a tape storage cartridge either in the tape drive or into the multiple-position storage magazine, a push-type solenoid is energized when the Z-stage once again begins to extend along the positive Z-axis. The solenoid is connected to a mechanical trigger, which in this preferred embodiment of the invention, is comprised of a catch-link with a catch-pin affixed to its distal end. The catch link, catch-pin combination is at rest in a down position, but rotates upward into the path of the lower gripping finger when the catch-link is activated by the solenoid. As the Z-stage approaches the storage magazine, and after the cartridge has entered the storage magazine or tape drive, the catch-pin engages the lower gripping finger applying a force that, in combination with the force of the Z-stage's motion, forces the lower gripping finger and the connected upper gripping finger to release the cartridge's notched recesses. Those skilled in the art will recognize that there a numerous mechanical trigger designs that are capable of the same function. As the Z-stage gets closer to the end of its Z extension, the gripping fingers open further, enabling them to clear the cartridge's notched recesses and the cartridge's upper and lower corners, while the leading edge of the Z-stage pushes the cartridge to its seated position within the storage magazine. At this point, the Z-stage withdraws from the storage magazine and travels back to the X-plate along the negative Z-axis, and the upper and lower spring-loaded, gripping fingers reset, awaiting another X-axis move to pick and place another cartridge.

DETAILED DESCRIPTION OF THE PREFERRED EMBODIMENTS

Figure 1:
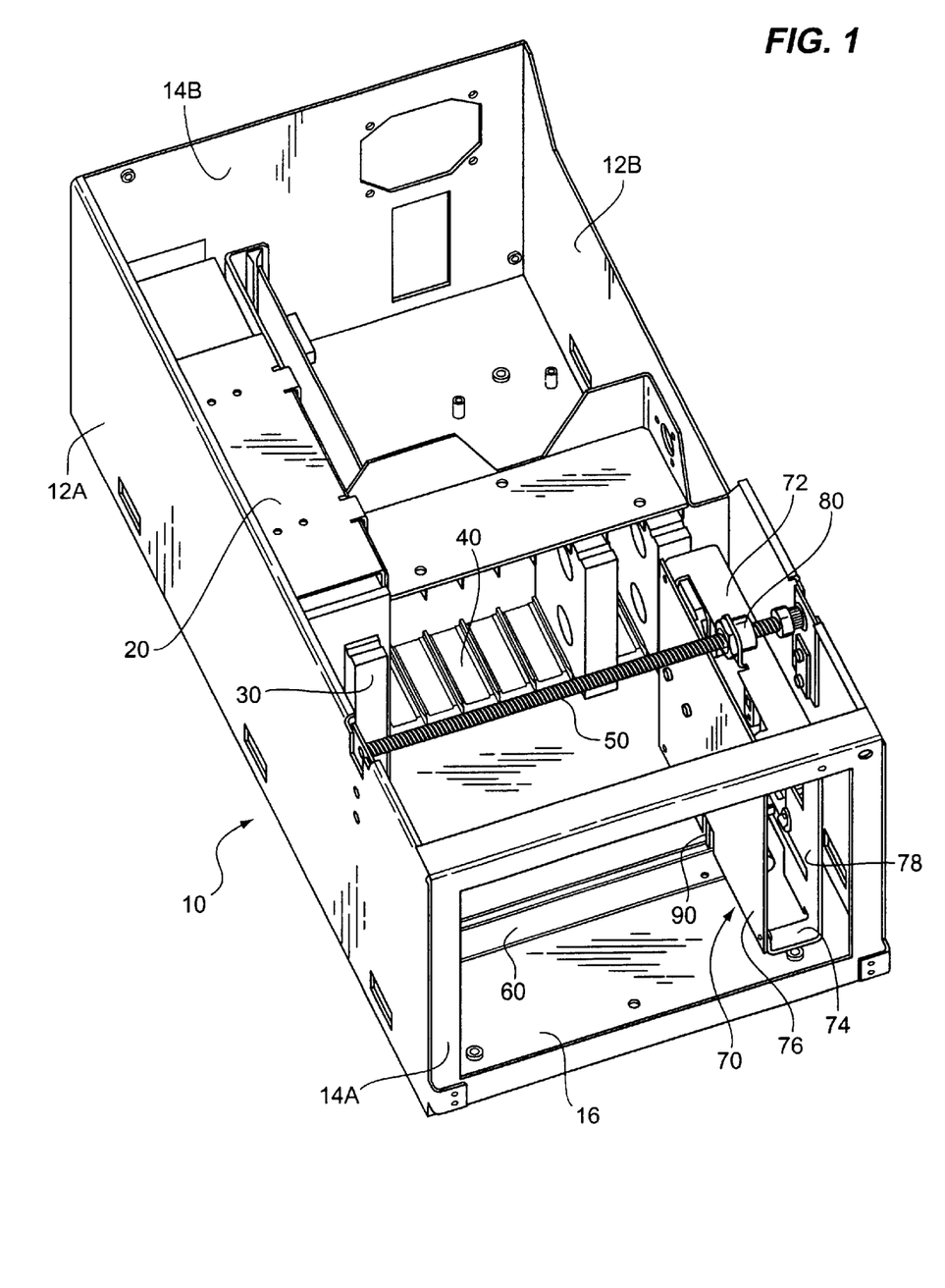
FIG. 1 is a perspective view of a storage library subsystem showing several tape storage cartridges, a multiple-position storage magazine, a magnetic tape drive, and the preferred robotic shuttle and transport system according to the present invention.

FIG. 1 illustrates an exemplary form of a preferred embodiment of the robotic shuttle which is the focus of this application, situated within a library storage subsystem. As shown in FIG. 1, a library storage subsystem is comprised generally of a rectangular library frame 10 consisting of a pair of longer walls 12A, 12B a pair of shorter walls 14A, 14B, and a bottom panel 16 (optional top panel not shown). A magnetic tape drive 20 is mounted to one of the longer walls in the interior of the library frame 12A, such that a cartridge insertion slot 30 is aligned substantially parallel to a fixed multi-position storage location 40, which is mounted to the opposite longer wall in the interior of the library frame 12B on one end, and mounted to an inner wall (not shown) on its other end. A worm screw 50 extends substantially parallel to a magnetic tape drive 20 and to a multi-position storage location 40 and is mounted to the interior of opposing walls of the library frame 12A, 12B. A grooved channel 60 likewise extends substantially parallel to a magnetic tape drive 20 and to a multi-position storage location 40 preferably directly beneath a worm screw 50 and is mounted to an interior bottom panel of the library frame 16.

A robotic shuttle assembly (an X-plate) 70 consisting of a top panel 72, a bottom panel 74, and a left 76 and a right 78 side panel, which, in combination, frame openings on opposite ends of the X-plate, is attached above to a worm screw 50 by means of a threaded nut 80 attached to a top panel 72, and attached below to a grooved channel 60 by means of a anti-rotation tab 90 attached to a bottom panel 74. The X-plate slidably moves the length of a grooved channel 60 across the width of the interior of the library frame 10 by means of the worm screw 50 which is powered by a motor (not shown). A worm screw 50 and a grooved channel 60 define the X-axis along which the X-plate 70 moves in both the positive and the negative direction. Although a worm screw and motor combination is illustrated in the exemplary embodiment, those skilled in the art would recognize that a multitude of linear motion drive mechanisms could be utilized to move the X-plate along the X-axis.

Figure 2:
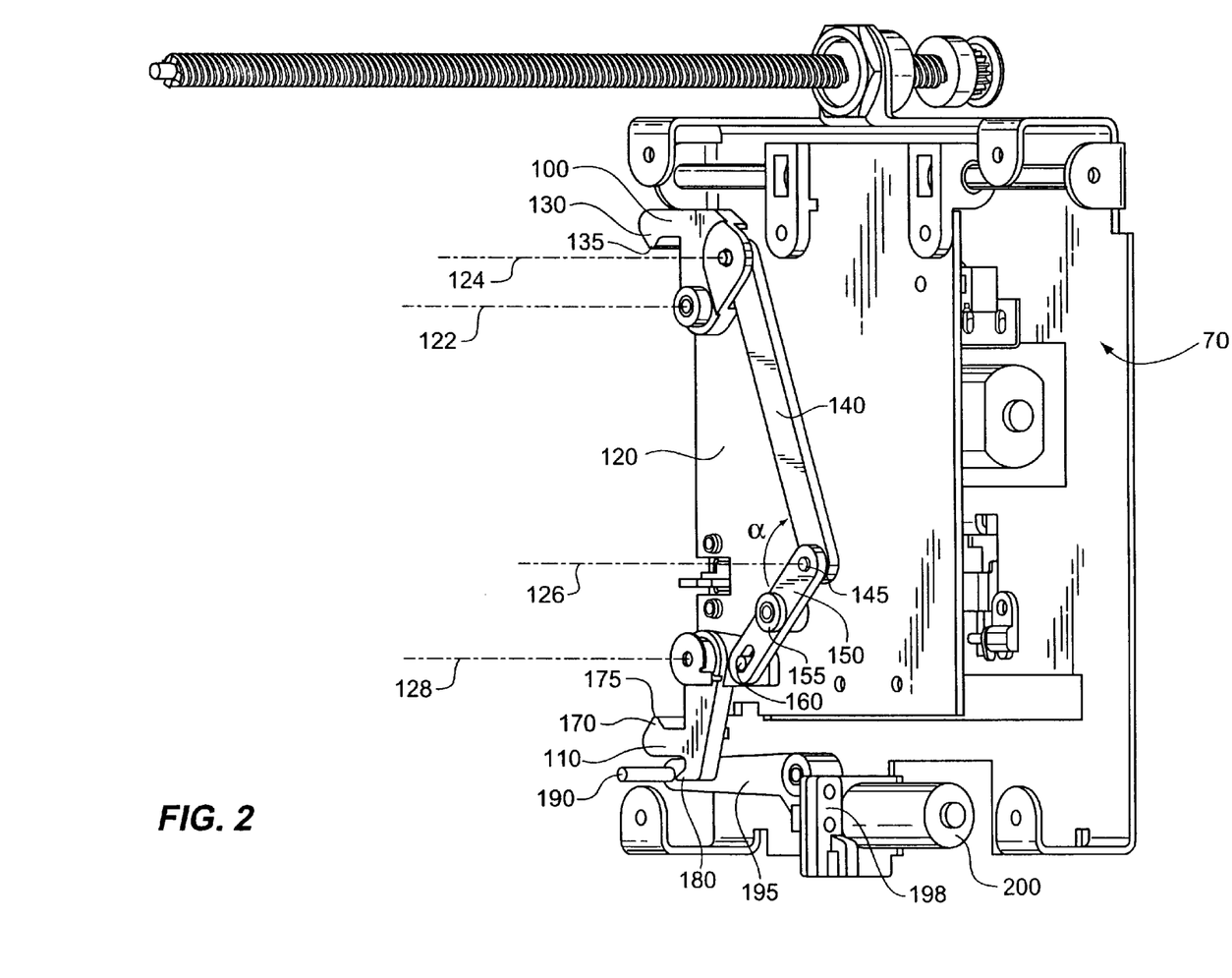
FIG. 2 is a partial perspective view of the preferred robotic shuttle's X-plate with one side panel removed to illustrate the robotic shuttle's internal components, and in particular, to show the preferred cartridge gripper assembly, including a pair of upper and lower spring-loaded, gripping fingers, their joining linkages, and a push-type solenoid and catch-pin system that are the integral components of the motorized stage's operation.

FIG. 2 illustrates the interior of the X-plate 70, and particularly demonstrates the inter-connectiveness between the upper 100 and lower 110 spring-loaded, gripping fingers. The upper gripping finger 100 substantially forms an inverted L-shape with the distal end of the longer leg pivotally attached to the robotic shuttle's interior plate (a Z-stage) 120 defining a first axis of rotation 122 around the pivot point, the longer leg situated substantially parallel to the leading edge of the Z-stage 120, the shorter leg extending distally from and substantially perpendicular to the leading edge of the Z-stage 120, the shorter leg incorporating a triangular aspect 130 with its apex 135 protruding downward along a negative Y-axis.

At the joinder of the longer leg and the shorter leg, the upper gripping finger 100 is pivotally linked to the distal end of the connecting link 140 defining a second axis of rotation 124 around the pivot point. The connecting link 140 is substantially rectangular in shape with its distal end connected by pin 145 to the proximal end of a shorter, pivot link 150 forming an angle of rotation α and a third axis of rotation 126. The pivot link 150 is mounted preferably at its mid-point to the Z-stage 120 by a stand-off 155 and is engaged at its proximal end with a slidable catch-pin 160 that is part of the lower spring-loaded, gripping finger 110.

The lower spring-loaded, gripping finger 110 substantially forms an inverted S-shape with the slidable catch-pin 160 of its proximal end connected to the pivot link 150. The lower gripping finger 110 is pivotally mounted to the Z-stage 120 by a pin which defines a fourth axis of rotation 128. The upper hook of the S-shaped bottom gripping finger 110 incorporates a triangular aspect 170 with its apex 175 protruding upward along a positive Y-axis substantially directly below the upper gripping finger's protruding triangular aspect 130. At the base of the lower hook of the S-shaped lower gripping finger 110 is a concave protrusion 180 curved outward along the positive Z-axis from the robotic shuttle's Z-stage with enough curvature to accommodate an independent catch pin 190.

The independent catch-pin 190 is preferably cylindrical and is attached to the distal end of a catch-link 195. The catch-link 195 is substantially rectangular and is mounted to the interior side of the X-plate 70. A bracket 198 is mounted substantially perpendicular between the left and the right side panels of the X-plate 70. On the proximal side of the bracket 198, a solenoid 200 is mounted, that upon activation, forces the catch-link 195 and catch-pin 190 combination to rotate upward and into the path of the lower gripping finger's concave protrusion 180. Although a solenoid 200 is illustrated in this exemplary embodiment of the robotic shuttle, those skilled in the art would recognize that a multitude of actuators could be utilized to trigger the generation of the necessary linear motion of the catch-link 195 and catch-pin 190 combination. The engagement with the catch-pin 190 opposes the lower gripping finger's natural spring bias and forces the lower gripping finger 110 downward along the negative Y-axis. This force, transferred through the pivot link 150 and connecting link 140 combination, in combination with the force generated by the Z-stage's 120 motion, simultaneously forces the upper gripping finger 100 upward along a positive Y-axis, thus releasing both gripping fingers' hold on the cartridge.

Figure 3:
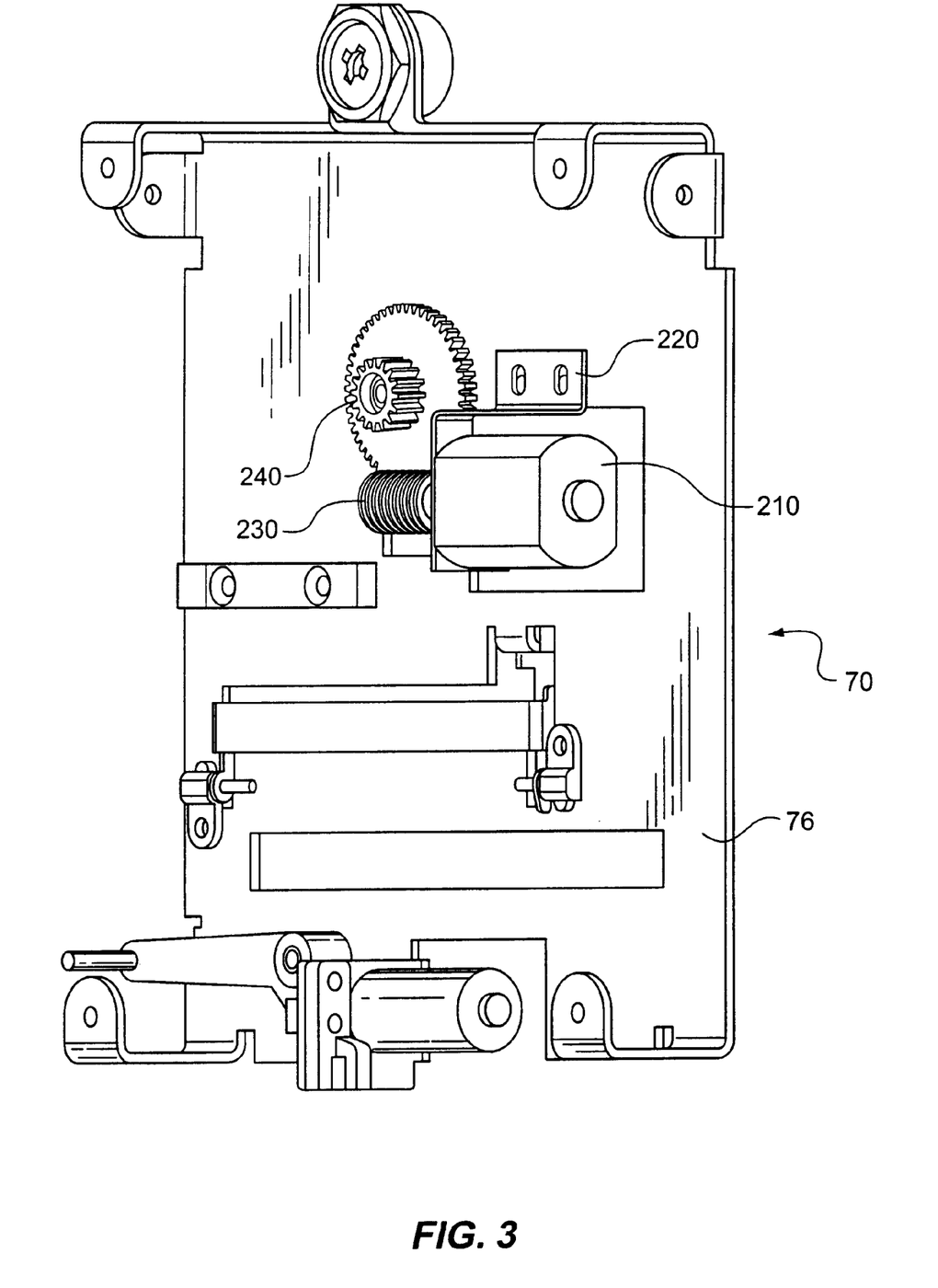
FIG. 3 is a partial perspective view of the preferred robotic shuttle's X-plate with the preferred cartridge gripper assembly removed to expose a motorized gear drive that allows the Z-stage to travel bi-directionally along the Z-axis.

FIG. 3 shows an interior view of the X-plate 70 with the Z-stage 120 removed. In this exemplary embodiment of the robotic shuttle, a motor 210 is mounted to the interior side of the X-plate 70 by a bracket 220. The motor 210 engages a worm gear 230, that when rotated, turns a pinion gear 240, thus generating motion for the robotic shuttle along the Z-axis. The pinion gear 240 is likewise mounted to the interior side of the X-plate 70. Although a motor-driven pinion gear drive is illustrated in this embodiment of the robotic shuttle, those skilled in the art would recognize that a multitude of assemblies could be utilized to generate Z-axis motion for the robotic shuttle.

Figure 4A:
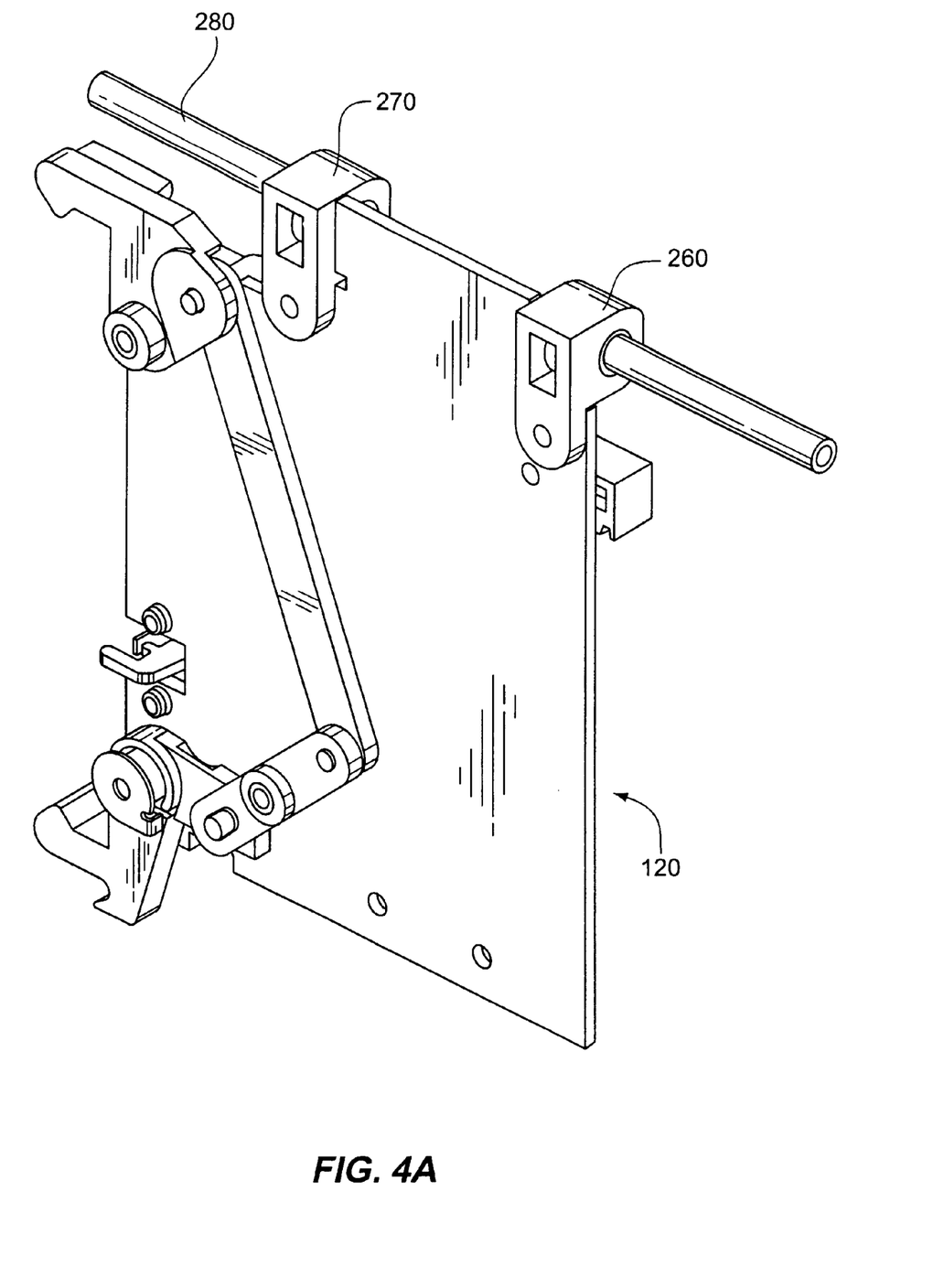
FIG. 4(a) and FIG. 4(b) are reverse images of the preferred robotic shuttle's Z-stage, with FIG. 4(a) particularly illustrating a pair of upper and lower spring-loaded, gripping fingers and their associated linkages, and with FIG. 4(b) particularly illustrating a rack of teeth to generate movement of a Z-stage along the positive and negative Z-axis. Both FIG. 4(a) and 4(b) also show a cylindrical rod which facilitates the Z-stage's travel.
Figure 4B:
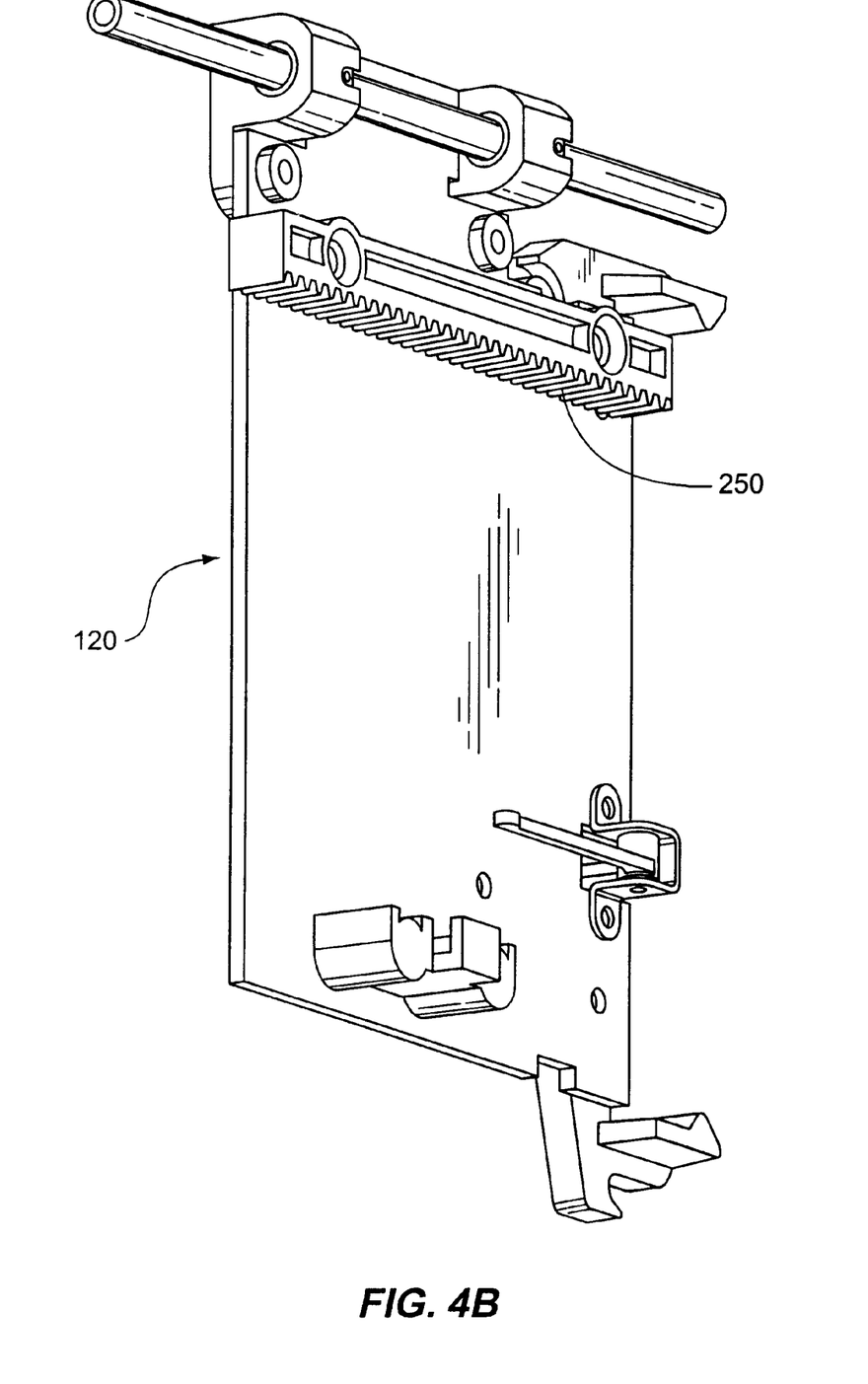

In FIG. 4B, a rack 250 with teeth is mounted to the Z-stage 120. When the pinion gear is turned, it engages the rack's teeth, thus moving the motorized Z-stage bi-directionally along the Z-axis. In FIGS. 4A and 4B, a right eye bracket sleeve 260 and a left eye bracket sleeve 270 are shown with a substantially cylindrical rod 280 passing through both. In the preferred embodiment of the invention, a bearing is disposed within each eye bracket sleeve that facilitates the bi-directional movement of the cylinder as it passes through each eye bracket sleeve. Those skilled in the art would recognize that other embodiments exist that facilitate the movement of a cylindrical rod through a set of eye bracket sleeves. As the motor 210 turns the pinion gear 240 and the rack's 250 teeth are engaged, the rod 280 guides the Z-stage 120 back and forth along the Z-axis.

Figure 5:
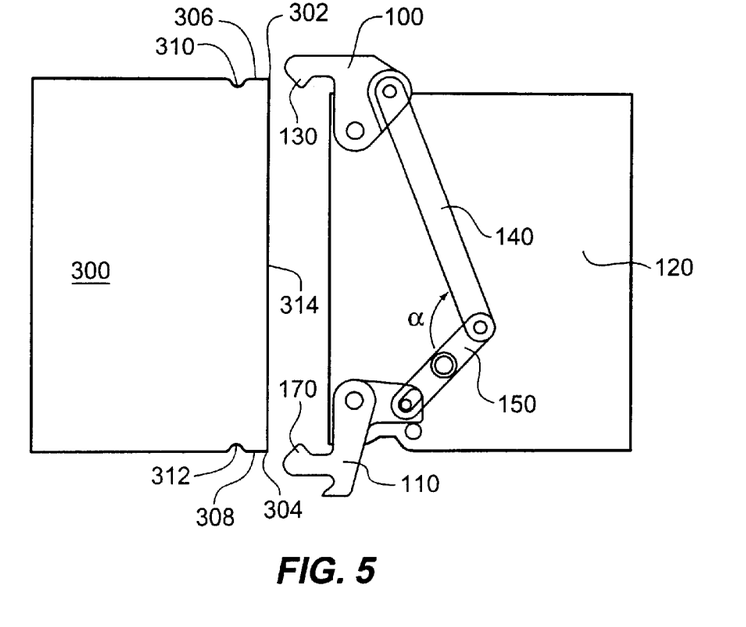
FIG. 5 is a two-dimensional sketch of the preferred cartridge gripper assembly in its natural, spring-loaded, closed position prior to engaging a tape storage cartridge.
Figure 6A:
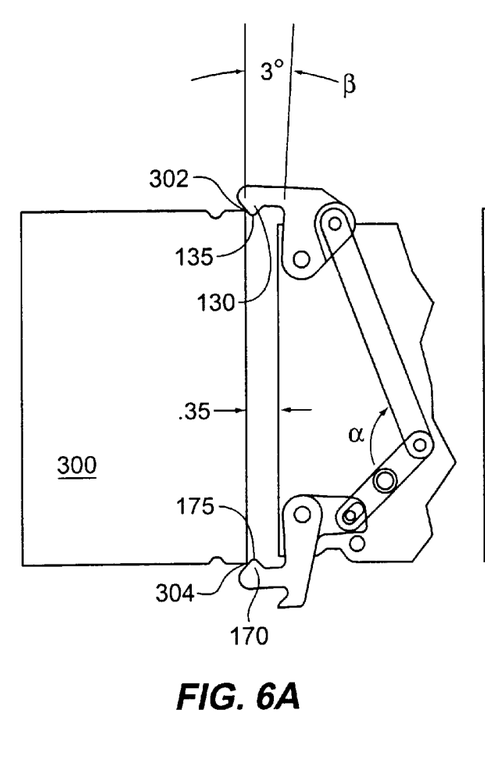
FIGS. 6(a) through (d) are two-dimensional sketches of the preferred gripper assembly's operational sequence as it engages a tape storage cartridge.
Figure 6B:
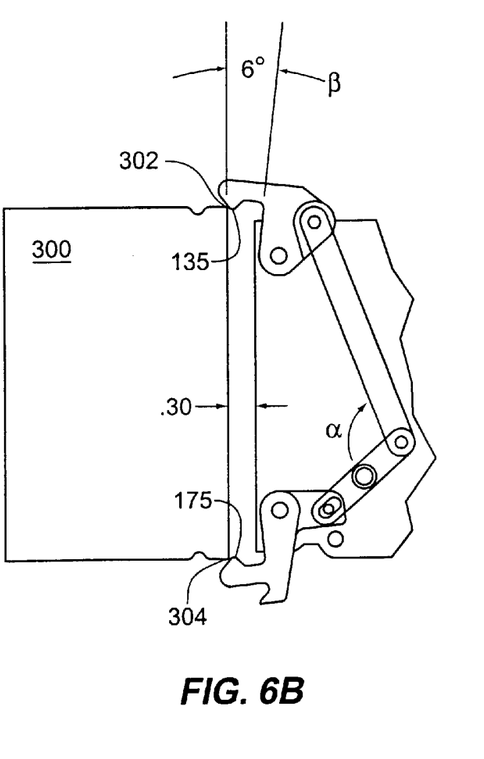
Figure 6C:
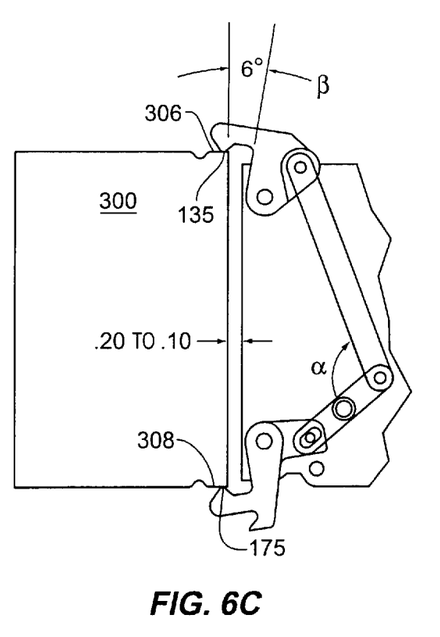
Figure 6D:
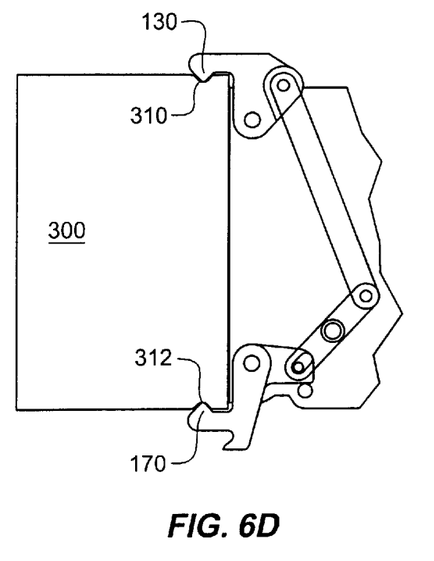

In FIGS. 5 through 8C, the sequential operation of the picking and placing of a tape storage cartridge are illustrated in detail. Although a tape storage cartridge is illustrated in the exemplary embodiment, those skilled in the art would recognized that other storage cartridge media could be utilize as well. In FIG. 5, the Z-stage 120 is in its natural position as is noted by the upper and lower spring-loaded, gripping fingers 100, 110 exhibiting the closed bias of their respective springs, i.e., the upper gripping finger's triangular protrusion 130 and the lower gripping finger's triangular protrusion 170 are aligned at their shortest distance of separation substantially along the Y-axis. This natural closed position is also characterized by a maximum angle of rotation a between the connecting link 140 and the pivot link 150. A tape storage cartridge 300 is also shown with a proximal edge 314, an upper corner 302 and a lower corner 304 at the top and bottom of the proximal edge 314 respectively, an upper edge 306 and a lower edge 308 substantially perpendicular to the proximal edge 314, and an upper notched recess 310 and a lower notched recess 312 inset from the upper edge 306 and the lower edge 308 respectively.

In FIGS. 6A through 6D, the Z-plate 120 is traveling toward a tape storage cartridge 300 along the Z-axis. As the apex 135 of the upper gripping finger's triangular protrusion 130 and the apex 175 of the lower finger's triangular protrusion 170 come into initial contact with the cartridge 300, the dynamic force of the Z-stage 120 and the static force of the cartridge's upper and lower corners 302, 304, overcome the gripping fingers' spring bias, camming the respective apexes 135, 175 of the respective triangular protrusions 130, 170 around the cartridge's upper and lower corners 302, 304 and off their Y-axis alignment at an angle β. The angle β increases as the robotic shuttle's Z-plate 120 continues its positive Z-axis travel and the gripping fingers are forced to travel along the tape storage cartridge's upper and lower edges 306, 308, thus increasing the angular profile β from the Y axis. When the apexes 135, 175 of the gripping fingers' triangular protrusions 130, 170 reach the cartridge's upper and lower notched recesses 310, 312, the triangular protrustions seat within the cartridge's notched recesses snugly via the force of the bias springs. The bias springs do not provide a clamping force on the cartridge for extraction.

Figure 7A:
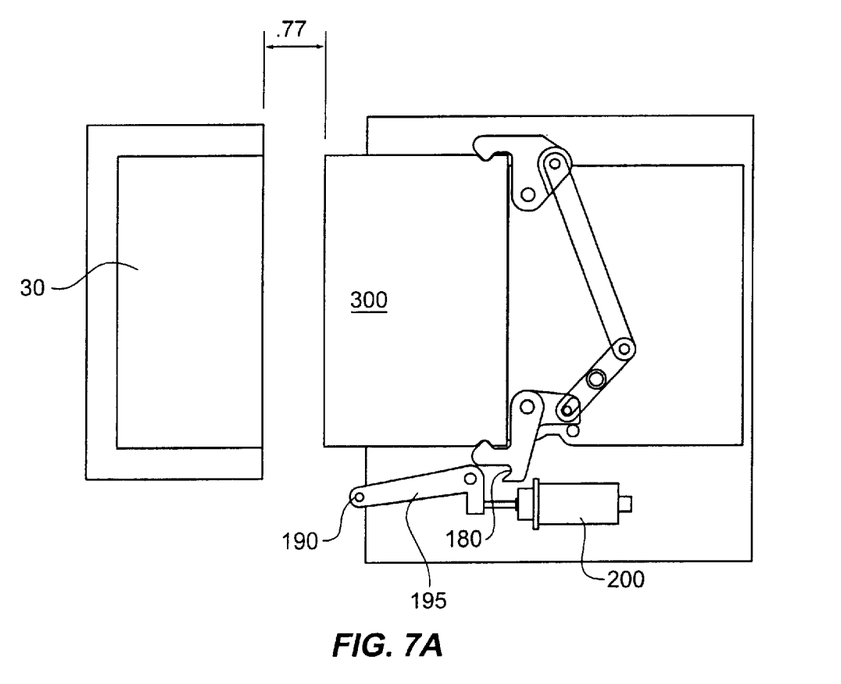
FIG. 7(a) and 7(b) are two-dimensional sketches of the preferred gripper assembly's operational sequence as, upon its approach to a cartridge magazine, the solenoid is energized, thus forcing the catch mechanical trigger to rotate upward to engage the lower spring-loaded, gripping finger.
Figure 7B:
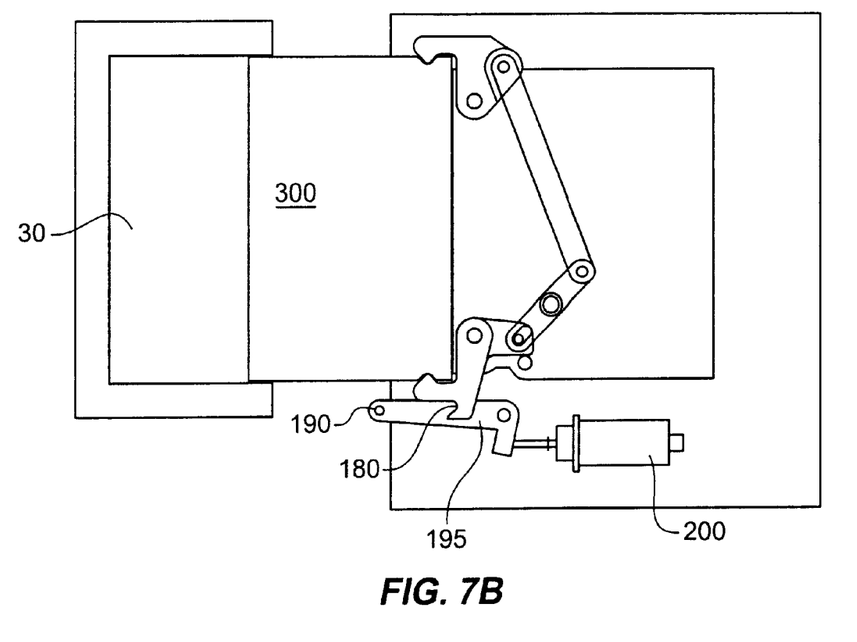
Figure 8A:
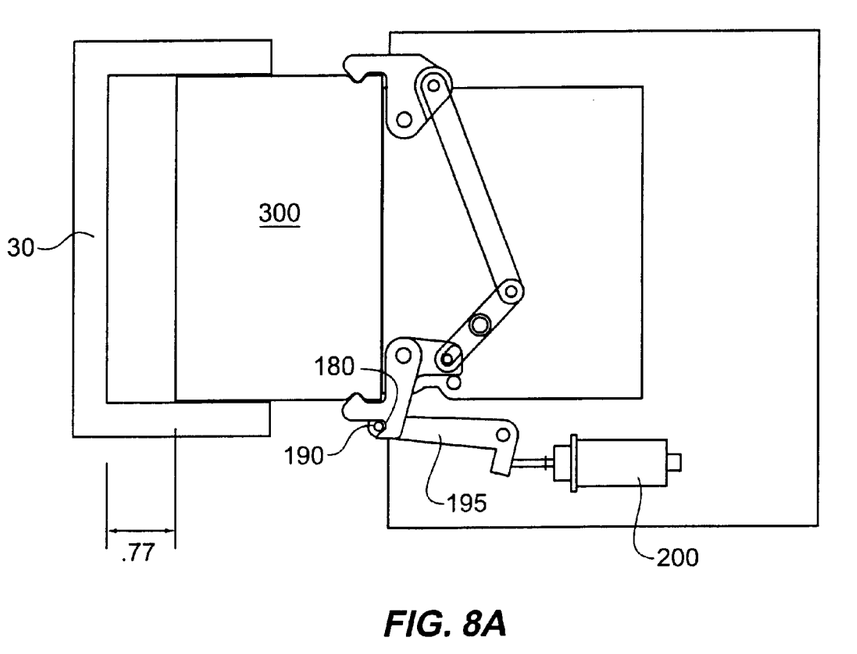
FIGS. 8(a) through 8(c) are two-dimensional sketches of the preferred gripper assembly's operational sequence as the catch-pin engages the lower spring-loaded, gripping finger, which in combination with the Z-stage's motion, forces both upper and lower spring-loaded, gripping fingers to disengage from a tape storage cartridge. The sketches further show the leading edge of the Z-stage pushing a tape storage cartridge the remainder of its way into a target drive.

Upon retraction of the Z-stage 120 along the negative Z-axis with the tape storage 106 cartridge 300 securely grasped by the upper and lower gripping fingers 100, 110, the X-plate 70 makes an X-axis move by means of its attached threaded nut 80 and the worm screw 50 plus its anti-rotation tab 90 and the grooved channel 60. The geometry of the gripping fingers, the pivot point of the gripping fingers, and the cartridge recesses provide a linear clamping force on the cartridge for extraction. As the linear force increases, the clamping force increases proportionately. Again, those skilled in the art will recognize that there are additional assemblies that can generate similar motion for the robotic shuttle along the X-axis. When the X-plate 70 arrives at the destination cartridge magazine 40 or the tape drive 30, the Z-stage 120 begins travel along the positive Z-axis with the tape storage cartridge 300 still held by the upper and lower spring-loaded, gripping fingers 100, 110. At a pre-programmed distance from the cartridge magazine 40 or tape drive 30, the solenoid 200 is instructed to activate as shown in FIG. 7B. Upon activation, the mechanical trigger, comprised of the connected catch-link 195 and catch-pin 190, is rotated upward into the path of the oncoming lower gripping finger's concave protrusion 180 as shown in FIG. 8A.

Figure 8B:
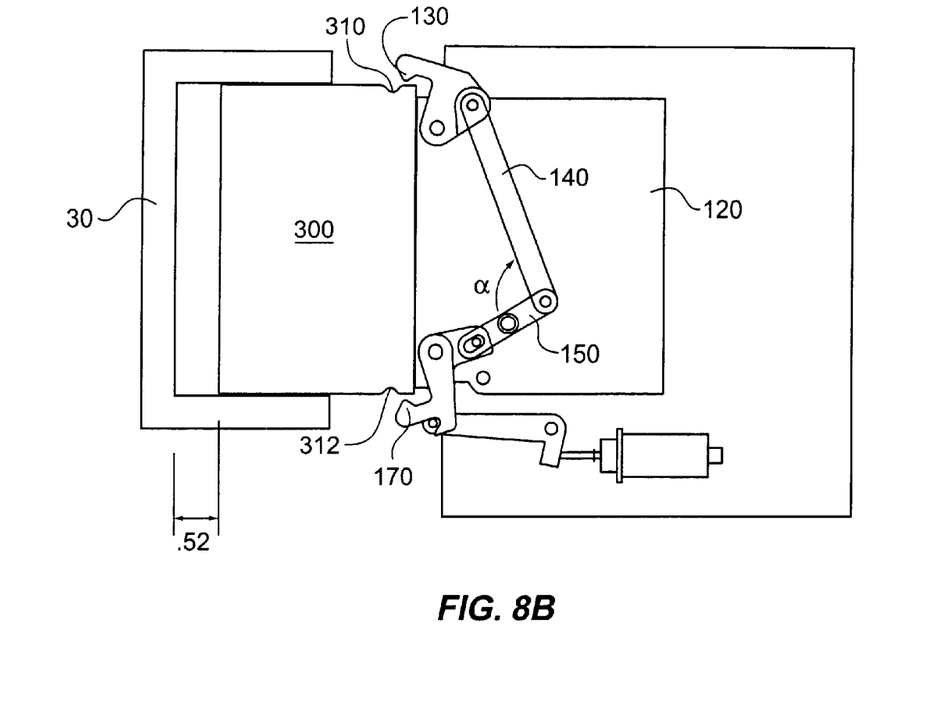
Figure 8C:
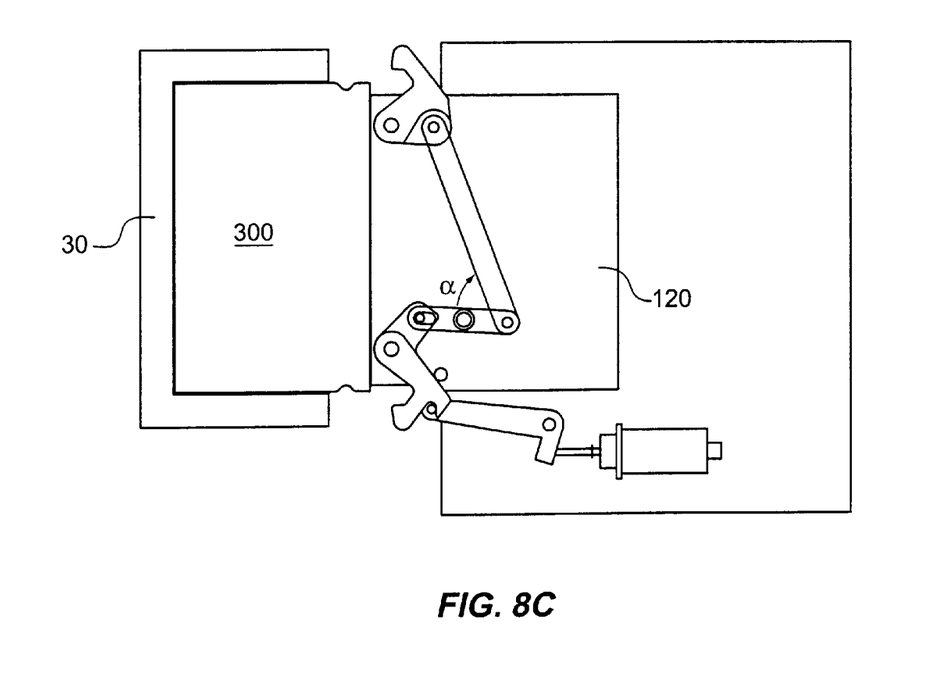

Before the tape storage cartridge 300 is fully seated within the cartridge magazine 40 or the tape drive 30, the catch-pin 190 engages the concave protrusion 180. The opposing dynamic force of the Z-stage 120 moving along the positive Z-axis and the camming force that the catch-pin 190 exerts upon the concave protrusion 180 causes the lower gripping finger's triangular protrusion 170 to begin to release the tape storage cartridge's lower notched recess 312. As this occurs, the pivot link 150 and the connecting link 140 rotate thus forcing the upper gripping finger's triangular protrusion 130 to simultaneously release the tape storage cartridge's upper notched recess 310. The angle of rotation a gradually decreases as the upper and lower spring-loaded, gripping fingers 100, 110 are forced further away from the cartridge 300. The leading edge of the Z-stage 120 retains contact with the cartridge's proximal edge 314. The dynamic force of the Z-stage's 120 continued positive Z-axis motion causes the cartridge 300 to be pushed into its final seating within the cartridge magazine 40 or the tape drive 30.

Upon completion, the Z-stage 120 begins to withdraw along the negative Z-axis toward the X-plate 70. As this motion occurs, the solenoid 200 deactivates, thus allowing the catch-pin 190 to disengage from the lower gripping finger's concave protrusion 180. This allows the natural spring bias to reset the gripping fingers for the next pick and place instruction.

What is claimed is:

1. A robotic shuttle assembly for manipulating a plurality of storage cartridges within a storage library subsystem, said robotic shuttle assembly comprising:
    a moveable stage comprising:
        an upper gripping finger, whereby said upper gripping finger is in a nominally closed position;
        a lower gripping finger, whereby said lower gripping finger is in a nominally closed position; and
        a plurality of arm linkages interconnecting the upper and lower gripping fingers;
    a moveable actuating means for controllably engaging said moveable stage, such that when said moveable stage is engaged, the upper and lower gripping fingers switch to an open position; and
    a means for moving said moveable stage substantially perpendicular to said robotic shuttle assembly's linear motion for positioning the upper and lower gripping fingers to grip and retain said storage cartridges.

2. The robotic shuttle assembly of claim 1, wherein said upper gripping finger further comprises a substantially triangular protrusion and wherein said lower gripping finger further comprises a substantially triangular protrusion.

3. The robotic shuttle assembly of claim 2, wherein the substantially triangular protrusion of said upper gripping finger is adapted to engage an upper notched recess of a storage cartridge and wherein the substantially triangular protrusion of said lower gripping finger is adapted to engage a lower notched recess of a storage cartridge.

4. The robotic shuttle assembly of claim 3, whereby when the upper and lower gripping fingers are each in a closed position, the substantially triangular protrusion of the upper gripping finger is adapted to grip and retain the upper notched recess of a storage cartridge and the substantially triangular protrusion of the lower gripping finger is adapted to grip and retain the lower notched recess of a storage cartridge.

5. The robotic shuttle assembly of claim 1, wherein said upper gripping finger is mounted to said moveable stage.

6. The robotic shuttle assembly of claim 5, wherein said upper gripping finger is connected to a first arm linkage.

7. The robotic shuttle assembly of claim 6, wherein said first arm linkage is connected at its opposite end to a second arm linkage.

8. The robotic shuttle assembly of claim 7, wherein said second arm linkage is mounted to said moveable stage.

9. The robotic shuttle assembly of claim 8, wherein said second arm linkage is connected at its opposite end to said lower gripping finger.

10. The robotic shuttle assembly of claim 9, wherein said lower gripping finger is mounted to said moveable stage.

11. The robotic shuttle assembly of claim 10, wherein said lower gripping finger further comprises a concave protrusion.

12. The robotic shuttle assembly of claim 11, wherein said concave protrusion is adapted to engage a mechanical trigger.

13. The robotic shuttle assembly of claim 1, wherein said moveable actuating means is power-driven.

14. The robotic shuttle assembly of claim 13, wherein said moveable actuating means comprises a solenoid and a mechanical trigger.

15. The robotic shuttle assembly of claim 14, wherein said mechanical trigger comprises a catch-pin and a catch link.

16. The robotic shuttle assembly of claim 15, wherein said mechanical trigger is mounted to said robotic shuttle assembly.

17. The robotic shuttle assembly of claim 14, wherein said mechanical trigger is capable of rotational motion.

18. The robotic shuttle assembly of claim 1, wherein said means for moving said moveable stage comprises a motor-driven pinion gear drive coupled to a rack.

19. The robotic shuttle assembly of claim 18, wherein said motor-driven pinion gear drive comprises a motor, a worm gear and a pinion gear.

20. The robotic shuttle assembly of claim 19, wherein said motor-driven pinion gear drive is capable of generating bidirectional linear motion.

21. The robotic shuttle assembly of claim 20, wherein said means for moving said moveable stage further comprises a cylindrical rod and a plurality of eye bracket sleeves.

22. The robotic shuttle assembly of claim 21, whereby said cylindrical rod passes through said plurality of eye bracket sleeves upon a generation of linear motion by said motor-driven pinion gear drive.

23. A robotic shuttle assembly for manipulating a plurality of storage cartridges within a storage library subsystem, said robotic shuttle assembly comprising:

a moveable stage comprising:
an upper gripping finger, whereby said upper gripping finger is in a nominally closed position;
a lower gripping finger, whereby said lower gripping finger is in a nominally closed position;
a connecting arm, whereby said connecting arm is pivotally connected to said upper gripping finger; and
a pivot arm, whereby said pivot arm is slidably connected at one end to said lower gripping finger, and whereby said pivot arm is also pivotally connected at its opposite end to said connecting arm;

a solenoid;
a catch-link, whereby said catch-link is pivotally mounted to said robotic shuttle assembly and whereby said catch-link is also connected to said solenoid;
a catch-pin, whereby said catch-pin is connected to said catch-link, and whereby said catch-pin controllably engages said moveable stage, such that when said moveable stage is engaged, the upper and lower gripping fingers switch to an open position;
a motor-driven pinion gear coupled to a rack;
a cylindrical rod; and
a plurality of eye bracket sleeves, whereby said cylindrical rod passes through the eye bracket sleeves.

24. The robotic shuttle assembly of claim 23, wherein said upper gripping finger further comprises a substantially triangular protrusion and wherein said lower gripping finger further comprises a substantially triangular protrusion.

25. The robotic shuttle assembly of claim 24, wherein the substantially triangular protrusion of said upper gripping finger is adapted to engage an upper notched recess of a storage cartridge and wherein the substantially triangular protrusion of said lower gripping finger is adapted to engage a lower notched recess of a storage cartridge.

26. The robotic shuttle assembly of claim 25, wherein when the upper and lower gripping fingers are each in a closed position, the substantially triangular protrusion of the upper gripping finger is adapted to grip and retain the upper notched recess of a storage cartridge and the substantially triangular protrusion of the lower gripping finger is adapted to grip and retain the lower notched recess of a storage cartridge.

27. The robotic shuttle assembly of claim 23, wherein said upper gripping finger is pivotally mounted to said moveable stage.

28. The robotic shuttle assembly of claim 27, wherein said upper gripping finger is pivotally connected to a connecting arm linkage.

29. The robotic shuttle assembly of claim 28, wherein said connecting arm linkage is pivotally connected at its opposite end to a pivot arm linkage.

30. The robotic shuttle assembly of claim 29, wherein said pivot arm linkage is mounted to said moveable stage.

31. The robotic shuttle assembly of claim 30, wherein said pivot arm linkage is slidably connected at its opposite end to said lower gripping finger.

32. The robotic shuttle assembly of claim 31, wherein said lower gripping finger is pivotally mounted to said moveable stage.

33. The robotic shuttle assembly of claim 32, wherein said lower gripping finger further comprises a concave protrusion.

34. The robotic shuttle assembly of claim 33, wherein said concave protrusion is adapted to engage said catch-pin.

35. The robotic shuttle assembly of claim 34, wherein said catch-link is capable of rotational motion.

36. The robotic shuttle assembly of claim 35, whereby when said solenoid is energized, said catch-link is set into rotational motion.

37. The robotic shuttle assembly of claim 36, wherein said motor-driven pinion gear drive is mounted to said robotic shuttle assembly.

38. The robotic shuttle assembly of claim 37, wherein said rack is mounted to said moveable stage, and wherein said rack is coupled to said motor-driven pinion gear drive.

39. The robotic shuttle assembly of claim 38, wherein said motor-driven pinion gear drive is capable of generating bi-directional linear motion.

40. The robotic shuttle assembly of claim 39, wherein said motor-driven pinion gear drive comprises a motor, a worm gear and a pinion gear.

41. The robotic shuttle assembly of claim 40, wherein said cylindrical rod is mounted to said robotic shuttle assembly.

42. The robotic shuttle assembly of claim 41, wherein said plurality of eye bracket sleeves are mounted to said moveable stage.

43. The robotic shuttle assembly of claim 42, wherein said cylindrical rod passes through said plurality of eye bracket sleeves upon a generation of linear motion by said motor-driven pinion gear drive.

44. A method of manipulating storage cartridges within a storage library subsystem, comprising:

controllably engaging a moveable stage to open upper and lower gripping fingers of the moveable stage; and
moving the moveable stage in a motion that is substantially perpendicular to a linear motion of a robotic shuttle assembly for positioning the upper and lower gripping fingers about one of the storage cartridges;
gripping and retaining the one of the storage cartridges with the upper and lower gripping fingers.

45. The method of claim 44, wherein controllably engaging the moveable stage comprises operating a solenoid to open the upper and lower gripping fingers.

* * * * *